UNITED STATES PATENT OFFICE.

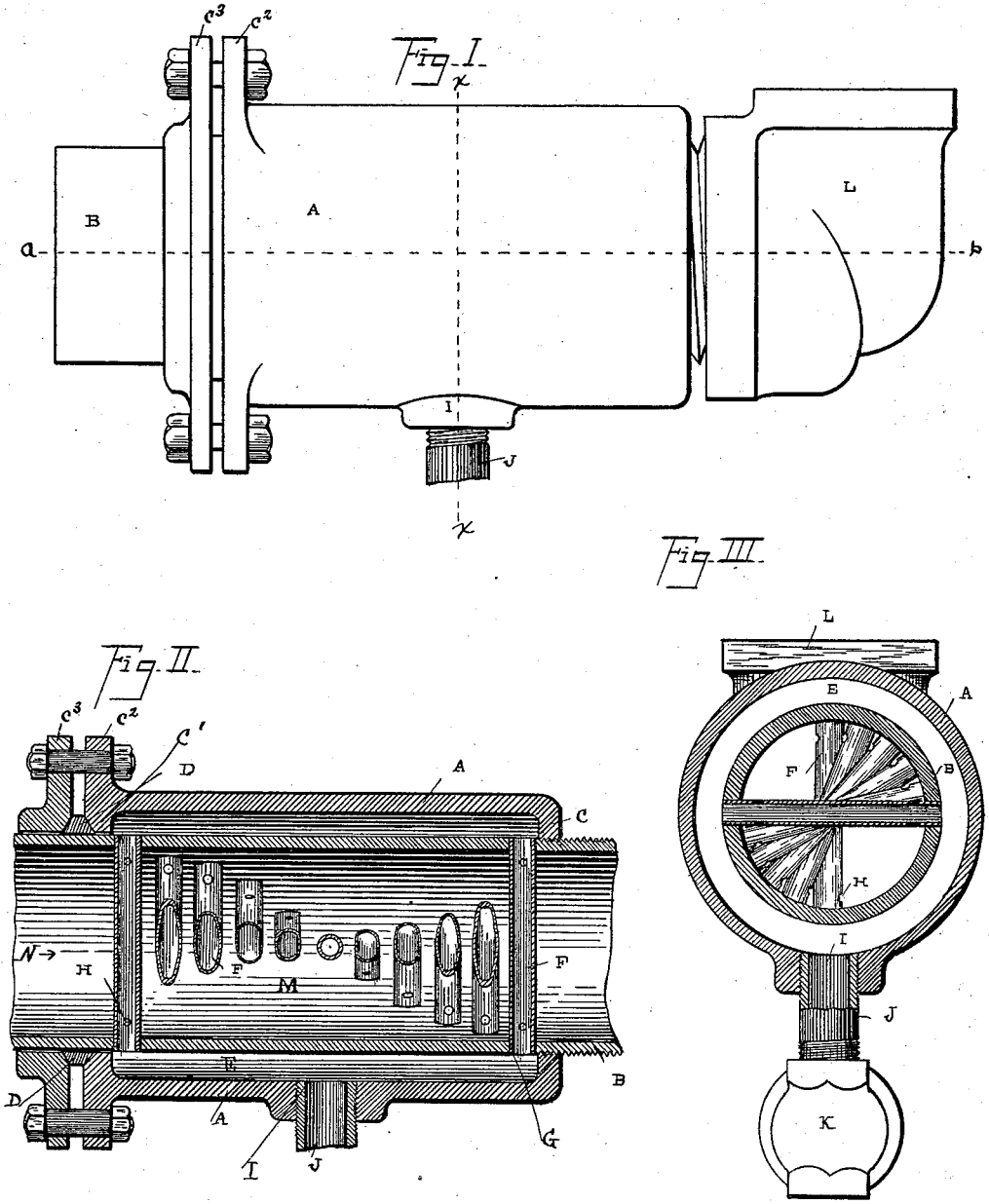

ROBERT G. KIRKWOOD, OF WHEELING, WEST VIRGINIA.

GAS-MIXING APPARATUS.

SPECIFICATION forming part of Letters Patent No. 571,196, dated November 10, 1896.

Application filed March 9, 1896. Serial No. 582,374. (No model.)

*To all whom it may concern:*

Be it known that I, ROBERT G. KIRKWOOD, a citizen of the United States, residing at Wheeling, in the county of Ohio and State of West Virginia, have invented certain new and useful Improvements in Gas-Mixing Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to apparatus for mixing air and gas for use in heating-burners or furnaces.

The object of the invention is to provide an improved device, of simple construction, for thoroughly mixing or commingling natural and other gases with air in suitable quantities and in such a manner that a permanent mixture is obtained to insure perfect combustion, and which can be used for heating and for all other purposes for which gaseous fuels are now used.

In the drawings, Figure 1 represents a side elevation of my improved mixing apparatus. Fig. 2 is a section on line $a\,b$ of Fig. 1 with the outlet to burner or furnace omitted; and Fig. 3 is a sectional view on line $x\,x$, Fig. 1, and showing valve for admission of gas.

Similar letters of reference in the drawings indicate corresponding parts.

My improved mixing apparatus consists of a length of pipe A, preferably of cast-iron, but may be of any suitable material, constituting an exterior casing. At each end of said pipe A is provided a flange C C', one of said flanges being screw-threaded on its inturned side to register with corresponding threads cut on the outer surface of the interior casing B. The flange C' at the opposite end of the outer casing has an extension $C^2$ forming a shoulder, which is fastened by nuts and bolts, as shown in the drawings, to a corresponding flange or ring $C^3$, made to slip over and surrounding pipe B. These two latter flanges are formed with grooves or recesses, said grooves or recesses completing a chamber around the circumference of the pipe B, which chamber is adapted to receive a suitable packing substance, as D. When the bolts are drawn tight, the flanges compress the packing into the recesses of the outer casing, making a gas and air tight joint.

The interior shell B consists of a length of pipe of wrought-iron or similar material. Pipe B is slightly smaller in diameter than pipe A, this construction forming a chamber E for gas between pipes A and B, said chamber having as end walls the flanges C C' of the casing A.

Disposed across the diameter of pipe B are small pipes or tubes F, (which, in actual size, are about one-eighth of an inch in diameter,) whose ends are inserted and expanded into holes G in the body of the interior casing B. These holes are drilled a short distance apart on a line drawn spirally around the circumference of casing B, and in such relative position that small pipes or tubes F, when inserted and in the required position, will extend diametrically across and through the inner casing B. Near the joints of the small pipes or tubes F with casing B in pipe F are drilled small apertures H, one or more in number, for the exit of gas, as will be further hereinafter pointed out.

On the under side of casing A is provided a screw-threaded opening or inlet I, connecting chamber E to a pipe J, which pipe is provided with a valve K to regulate the admission of gas from the source of supply.

In the inlet end of pipe B, I usually place a gate (not shown in the drawings), to regulate the quantity of air or blast.

At the screw-threaded end of pipe B an elbow L or other suitable connection is attached for communication with the furnace or burner.

The operation of my improved gas-mixing apparatus is as follows: Gas is admitted into chamber E through valve and inlet-pipe J. After circulating in chamber E the gas enters and flows into small pipes or tubes F, whence it is ejected through the small apertures H in said pipes into the body of the chamber M of the casing B. Air is forced into the casing B at N and through said pipe, carrying with it the gas issuing from the apertures H, in small pipes F, as before described. It will be seen that air forced through pipe B will be caused to flow spirally or nearly so through said pipe on account of the manner of placing small pipes F, and the gas will be broken up into jets or films and will not be permitted to pass in a body through chamber M. This position of pipes F will also cause gas to issue from apertures H in said pipes at a deflected angle across pipe B. This, with the twisting or spiral motion given to the air, insures a thorough mixing or commingling of the gas and air before being conducted to the burner or furnace. After being thoroughly mixed the mixture is carried, as by elbow L, to the furnace or heater for combustion.

Having thus fully described my invention, what I claim, and desire to secure by Letters Patent, is—

1. The combination of the inner tube, an outer tube surrounding a part of the inner tube, the said tubes forming between them a chamber for the reception and retention of a fluid, a packing encircling the inner tube and bearing against the outer tube, and a clamp for holding the packing against the outer tube, substantially as described.

2. The combination of the outer shell, with the inner shell provided with apertures opposite each other and the series of apertures arranged spirally, cross-pipes extending from side to side of the shell with their ends held in these apertures, said cross-pipes having apertures or openings inside the shell, a gas supply to the chamber between the outer and inner shell and means for propelling air longitudinally through the inner shell, all combined substantially as described.

In testimony whereof I affix my signature in presence of two witnesses.

ROBERT G. KIRKWOOD.

Witnesses:
G. W. ATKINSON,
C. P. FLICK.